US007447136B2

(12) United States Patent
Hama et al.

(10) Patent No.: US 7,447,136 B2
(45) Date of Patent: Nov. 4, 2008

(54) OPTICAL PICKUP AND OPTICAL DISC APPARATUS

(75) Inventors: Toru Hama, Kanagawa (JP); Nobuhiko Ando, Tokyo (JP)

(73) Assignee: Sony Corporation (JP)

(*) Notice: Subject to any disclaimer, the term of this patent is extended or adjusted under 35 U.S.C. 154(b) by 199 days.

(21) Appl. No.: 11/375,352

(22) Filed: Mar. 14, 2006

(65) Prior Publication Data

US 2006/0245082 A1 Nov. 2, 2006

(30) Foreign Application Priority Data

Mar. 16, 2005 (JP) ............................ 2005-074580

(51) Int. Cl.
*G11B 7/00* (2006.01)

(52) U.S. Cl. .................................... 369/112.3; 359/726

(58) Field of Classification Search ................. 359/726; 369/112.3, 44.23, 44.37, 112.01
See application file for complete search history.

(56) References Cited

U.S. PATENT DOCUMENTS 5,615,200 A * 3/1997 Hoshino et al. ........ 369/112.04
6,665,130 B2 * 12/2003 Kimura ...................... 359/719
7,206,277 B2 * 4/2007 Ogasawara et al. .... 369/112.12

FOREIGN PATENT DOCUMENTS

| | | | |
|---|---|---|---|
| JP | 11-110774 | A | 4/1999 |
| JP | 2000-353333 | A | 12/2000 |
| JP | 2004-071081 | A | 3/2004 |
| JP | 2004-164825 | A | 6/2004 |
| WO | 2005-076265 | A | 8/2005 |

* cited by examiner

*Primary Examiner*—Timothy J Thompson
(74) *Attorney, Agent, or Firm*—Lerner, David, Littenberg, Krumholz & Mentlik, LLP

(57) ABSTRACT

An optical pickup includes a light source for emitting a light beam; an objective lens for condensing the light beam emitted from the light source and irradiating an optical recording medium with the condensed light beam; a collimator lens, disposed between the light source and the objective lens, for forming the light beam emitted from the light source into a parallel light beam and guiding the parallel light beam to the objective lens; and an aberration correcting device, disposed in an optical path connecting the light source and the optical recording medium, for correcting aberration. The aberration correcting device is disposed in an optical path connecting the light source and the collimator lens.

8 Claims, 6 Drawing Sheets

10
102
22
24
20
2002
D1
18
16
D2
14
1401
1202
12

10
L
12
22
102

18
20
24
ΔL0 + ΔL1
12
22
102

18
14
16
20
24
ΔL0
12
16
22
102

14
18
2002
20
24

OPTICAL PICKUP AND OPTICAL DISC APPARATUS

CROSS-REFERENCE TO RELATED APPLICATIONS

The present application claims priority from Japanese Patent Application No. JP 2005-074580 filed on Mar. 16, 2005, the disclosure of which is hereby incorporated by reference herein.

BACKGROUND OF THE INVENTION

The present invention relates to an optical disc apparatus for recording a light signal onto and reproducing it from an optical recording medium and to an optical pickup used in the optical disc apparatus.

An optical pickup which records information onto and reproduces it from an optical recording medium, such as a CD-R, a DVD±R, or a DVD-RAM, capable of being used for both a recording operation and a reproducing operation is available.

Such an optical pickup performs a recording and/or a reproducing operation by forming a light beam emitted from a light source into a parallel light beam by a collimator lens and irradiating the optical recording medium with the parallel light beam by an objective lens.

However, in such an optical pickup, aberration caused by variations in the characteristics of an optical element (optical component) in an optical system including a light source and an objective lens, or aberration caused by variations in the thickness of an optical recording medium, or aberration caused by differences in the locations of recording layers of a two-layer optical recording medium occurs.

Such aberrations have a great influence on the characteristics of a recording signal that is recorded onto an optical recording medium or on the characteristics of a reproduction signal that is reproduced from the optical recording medium. Therefore, for example, a proposal has been made to correct the aberrations by an aberration correcting device that is disposed in an optical system of an optical pickup and that includes a liquid crystal element (refer to Japanese Unexamined Patent Application Publication No. 2004-71081).

In the above-described related optical pickup, the aberration correcting device is disposed in an optical path connecting a collimator lens and an objective lens, that is, in the optical path in which a parallel light beam travels.

In reducing the size of the optical pickup, it is important to reduce the distance between the collimator lens and the objective lens. When the aberration correcting device is disposed between the collimator lens and the objective lens, clearances are typically provided between the aberration correcting device and the collimator lens that are adjacent each other and between the aberration correcting device and the objective lens that are adjacent each other in order to prevent interference (such as thermal expansion) therebetween. Therefore, such an optical pickup is disadvantageous from the viewpoint of reducing size.

In addition, the aberration correcting device itself has aberrations. Such aberrations tend to occur, the larger the effective diameter of a light beam passing through the aberration correcting device, that is, the larger the aberration correcting device. Therefore, the larger the aberration correcting device, the greater the costs for restricting such aberrations.

It is desirable to provide an optical pickup and an optical disc apparatus which are advantageous from the viewpoints of reducing size while reducing aberration and reducing costs.

SUMMARY OF THE INVENTION

According to an embodiment of the present invention, there is provided an optical pickup including a light source for emitting a light beam, an objective lens for condensing the light beam emitted from the light source and irradiating an optical recording medium with the condensed light beam, a collimator lens, disposed between the light source and the objective lens, for forming the light beam emitted from the light source into a parallel light beam and guiding the parallel light beam to the objective lens, and an aberration correcting device, disposed in an optical path connecting the light source and the optical recording medium, for correcting aberration. The aberration correcting device is disposed in an optical path connecting the light source and the collimator lens.

According to another embodiment of the present invention, there is provided an optical disc apparatus including a driver for holding an optical recording medium and rotationally driving the optical recording medium, and an optical pickup for irradiating with a recording and/or a reproduction light beam the optical recording medium which is rotationally driven by the driver and detecting a reflection light beam reflected by the optical recording medium as a result of irradiating the optical recording medium with the recording and/or the reproduction light beam. The optical pick includes a light source for emitting the light beam, an objective lens for condensing the light beam emitted from the light source and irradiating the optical recording medium with the condensed light beam, a collimator lens, disposed between the light source and the objective lens, for forming the light beam emitted from the light source into a parallel light beam and guiding the parallel light beam to the objective lens, and an aberration correcting device, disposed in an optical path connecting the light source and the optical recording medium, for correcting aberration. The aberration correcting device is disposed in an optical path connecting the light source and the collimator lens.

In the optical pickup, the focal length of the collimator lens is typically provided between the light source and the collimator lens. This focal length, that is, the distance between the light source and the collimator lens is larger than the thickness of the aberration correcting device.

According to the embodiments of the present invention, focusing attention on this distance, the aberration correcting device is disposed in the optical path connecting the light source and the collimator lens. Therefore, it is possible to reliably prevent interference between the aberration correcting device and the light source and between the aberration correcting device and the collimator lens. Consequently, an increase in the length of the optical path of the optical system of the optical pickup is restricted. This is advantageous from the viewpoint of reducing the size of the optical pickup and the optical disc apparatus.

In addition, since the aberration correcting device is disposed in the optical path connecting the light source and the collimator lens, the closer the aberration correcting device is to the light source, the smaller the effective diameter of a light beam at the aberration correcting device. Therefore, the aberration correcting device can be reduced in size, which is advantageous from the viewpoint of reducing manufacturing costs of the aberration correcting device.

DETAILED DESCRIPTION

An aberration correcting device is disposed in an optical path connecting a light source and a collimator lens.

First Embodiment

An optical pickup and a recording/reproducing apparatus according to embodiments of the present invention will hereunder be described in detail with reference to the drawings.

Figure 1:
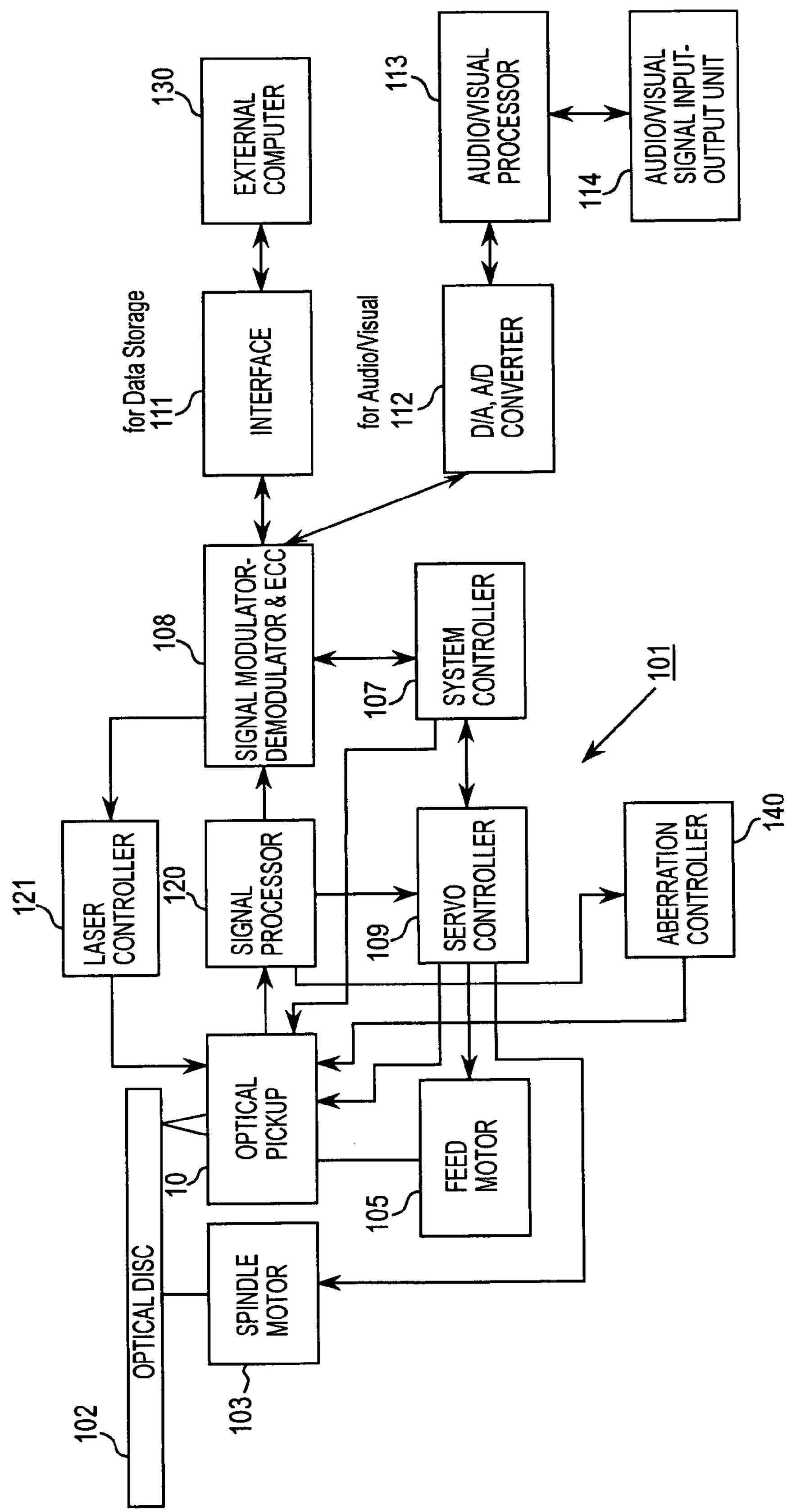
FIG. 1 is a block diagram showing a structure of an optical disc apparatus including an optical pickup according to a first embodiment of the present invention.

FIG. 1 is a block diagram showing a structure of an optical disc apparatus including an optical pickup according to a first embodiment of the present invention. The optical disc apparatus shown in FIG. 1 is an example, described below, of a recording/reproducing apparatus to which an optical pickup can be mounted.

In FIG. 1, an optical disc apparatus 101 includes a spindle motor 103, an optical pickup 10, and a feed motor 105. The spindle motor 103 serves as a driver for rotationally driving an optical disc 102 serving as an optical recording medium such as a CD-R, a DVD±R, or a DVD-RAM. The feed motor 105 serves as a driver of the optical pickup 10. Here, the driving of the spindle motor 103 is controlled at a predetermined rotational speed by a system controller 107 and a servo controller 109.

A signal modulator-demodulator and ECC block 108 modulates/demodulates and performs an ECC (error correcting code) addition operation on a signal output from a signal processor 120. A signal recording surface of the optical disc 102 that rotates in accordance with a command from the system controller 107 and the servo controller 109 is irradiated with a light beam by the optical pickup 10. By such light irradiation, a light signal is recorded onto or reproduced from the optical disc 102.

The optical pickup 10 is formed so that it can, on the basis of a reflection light beam reflected from the signal recording surface of the optical disc 102, detect various types of light beams and supply signals corresponding to these light beams to the signal processor 120.

The signal processor 120 is formed so that it can, on the basis of the detected signals corresponding to the respective light beams, generate servo control signals, that is, a focusing error signal, a tracking signal, an RF signal, a monitor signal for running OPC processing (R-OPC signal), and an ATIP signal for controlling the rotation of the optical disc when recording. In addition, in accordance with the type of recording medium on which a reproducing operation is performed, the servo controller 109, the signal modulator-demodulator and ECC block 108, etc. perform predetermined operations, such as demodulation and error correction, based on these signals.

Here, if a recording signal demodulated by the signal modulator-demodulator and ECC block 108 is used to, for example, store data in a computer, the recording signal is sent to, for example, an external computer 130 through an interface 111. Accordingly, for example, the external computer 130 is formed so that it can receive a signal recorded on the optical disc 102 as a reproduction signal.

On the other hand, if the recording signal demodulated by the signal modulator-demodulator and ECC block 108 is for an audio/visual operation, a D/A converting section of a D/A, A/D converter 112 converts the recording signal from a digital signal to an analog signal and supplies the analog signal to an audio/visual processor 113. Then, the audio/visual processor 113 performs an audio/video signal operation and transmits the signal to an external pickup/projector through an audio/visual signal input-output unit 114.

The optical pickup 10 is disposed on a slide base (not shown) that is disposed so that the slide base can reciprocate in a straight line along a radial direction (tracking direction) of the optical disc 102.

The feed motor 105 is connected to the slide base through, for example, a feed screw, so that the optical pickup 10 reciprocates along with the slide base in the tracking direction by driving the feed motor 105.

The controlling of the feed motor 105 and the controlling in a focusing and the tracking direction of an actuator 24 (see FIG. 2) holding an objective lens 22 (see FIG. 2) of the optical pickup 10 are carried out by the servo controller 109.

More specifically, the servo controller 109 controls the spindle motor 103 on the basis of an ATIP signal and controls the actuator on the basis of a focusing error signal and a tracking error signal.

A laser controller 121 controls a light source (laser light source) in the optical pickup 10. The laser controller 121 controls an output power (light-exiting power) of the laser light source on the basis of a power monitor signal supplied from a power monitor circuit 200.

An aberration controller 140 is formed so that, on the basis of an RF signal input from the signal processor 120, the aberration controller 140 generates a drive signal based on aberration, described later, to be corrected and supplies the generated drive signal to an aberration correcting device 14 (described later).

Figure 2:
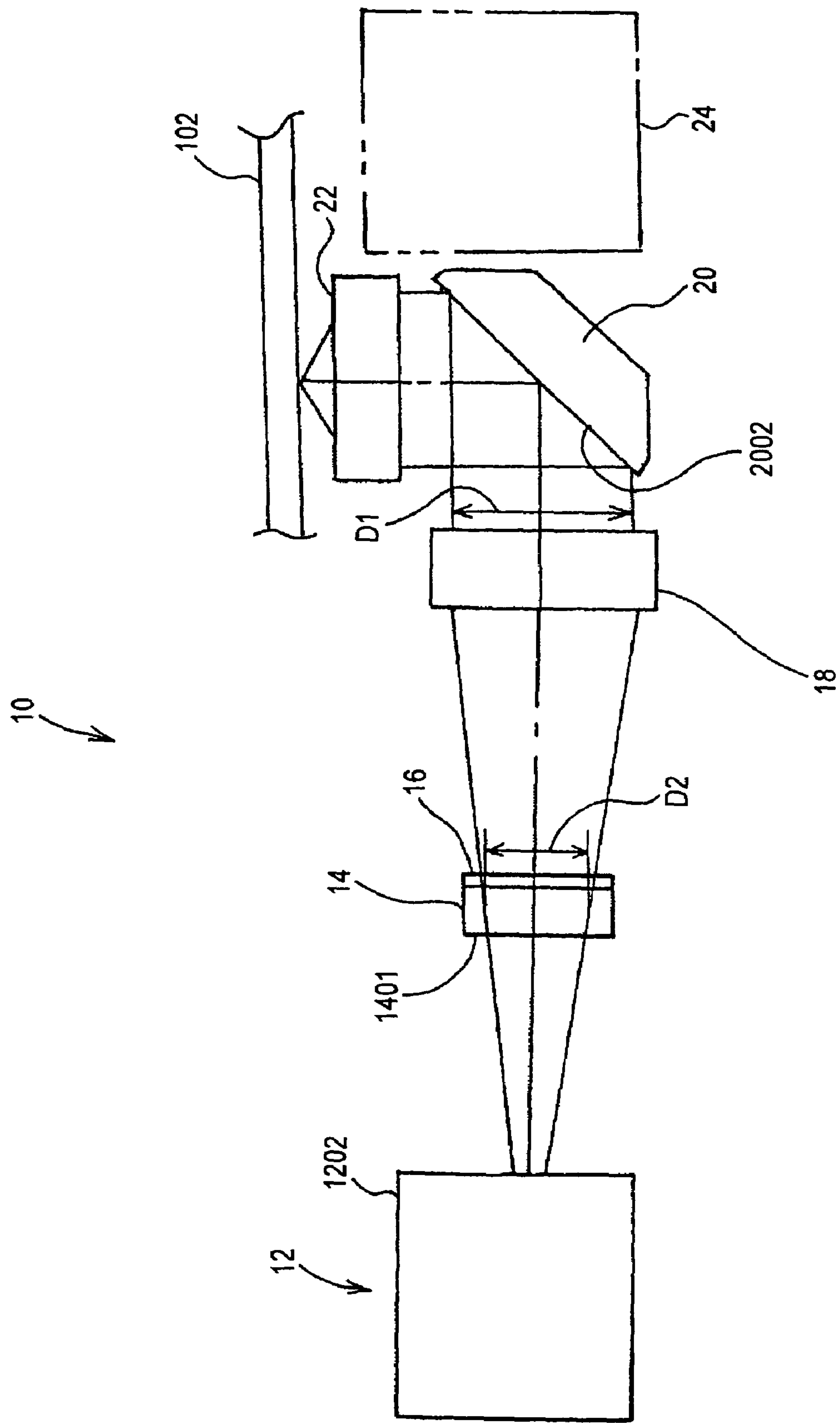
FIG. 2 shows a structure of an optical system of the optical pickup according to the first embodiment of the present invention.

FIG. 2 shows a structure of an optical system of the optical pickup according to the first embodiment of the present invention.

As shown in FIG. 2, the optical system of the optical pickup 10 includes an integrated optical device (laser coupler) 12, the aberration correcting device 14, a ¼ wavelength plate 16, a collimator lens 18, a rising mirror 20, an objective lens 22, and the actuator 24. These parts are formed by mounting them on the slide base (not shown).

The aberration correcting device 14, the ¼ wavelength plate 16, the collimator lens 18, the rising mirror 20 are disposed in a straight line in that order in front of the integrated optical device 12, and the objective lens 22 is disposed above the rising mirror 20.

The integrated optical device 12 includes parts that are not shown such as a light source (formed by a laser diode), a grating element, a signal-reproduction light-receiving element, a light-source-monitoring light-receiving element, a prism, and a beam splitter. These parts are mounted to one base and accommodated in a case 1202 and may have any of the various related structures that are publicly known.

A light beam is emitted from the light source towards the aberration correcting device 14 through the prism, the beam splitter, and the grating element. In addition, an incident reflection light beam from the aberration correcting device 14 is guided to the signal-reproduction light-receiving element through the prism and the beam splitter. Then, the signal-reproduction light-receiving element detects a focusing error signal, a tracking error signal, an RF signal, etc.

A portion of the light beam emitted from the light source is directly guided to the light-source-monitoring light-receiving element through the prism. The light-source-monitoring light-receiving element detects a monitor signal of a light-exiting power of the light source.

The grating element splits the light beam emitted from the light source into three light beams.

Various related methods that are publicly known may be used for detecting a tracking error and a focusing error. For example, it is possible to detect the tracking error signal by a three-beam method and to detect the focusing error signal by an astigmatic method.

The collimator lens 18 is formed so that the light beam emitted from the light source as a divergent light beam is incident upon the collimator lens 18 through the aberration correcting device 14 and the ¼ wavelength plate 16 and so that the light beam exits as a parallel light beam towards the rising mirror 20. The collimator lens 18 is disposed so that its distance from the light source is the same as the focal length of the collimator lens 18.

The cross section of the light beam exiting towards the rising mirror 20 from the collimator lens 18 is uniform along the direction of propagation of the light beam.

A reflection surface 2002 of the rising mirror 20 is disposed at an angle of 45 degrees with respect to the optical axis of the collimator lens 18. The rising mirror 20 is formed so that the light beam guided from the collimator lens 18 as a parallel light beam is reflected by being upwardly bent by 90 degrees by the reflection surface 2002.

The optical axis of the objective lens 22 is disposed at an angle of 45 degrees with respect to the reflection surface 2002. The objective lens 22 is formed so the light beam reflected by the reflection surface 2002 as a parallel light beam is condensed and is used to irradiate a recording layer of the optical disc 102.

The actuator 24 is formed so that the objective lens 22 is moved in a focusing direction and the tracking direction by a drive signal supplied from the servo controller 109. The actuator 24 may be an actuator having any of the various related structures that are publicly known.

A reflection light beam reflected by the recording layer of the optical disc 102 impinges upon the objective lens 22 and is formed into a parallel light beam again. Then, the light beam is reflected by the reflection surface 2002 and is condensed by the collimator lens 18. The condensed light is guided to the integrated optical device 12 through the ¼ wavelength plate 16 and the aberration correcting device 14 and is received by the signal-reproduction light-receiving element through the prism.

The ¼ wavelength plate 16 converts the light beam that is a linearly polarized light beam (which vibrates in an X-axis direction that is the direction in which the linearly polarized light beam is emitted from the light source) into a circularly polarized light beam, and guides the circularly polarized light beam to the optical disc 102. The ¼ wavelength plate 16 also converts the reflection light beam that is a circularly polarized light beam guided from the optical disc 102 into a linearly polarized light beam that vibrates in a Y-axis direction.

The ¼ wavelength plate 16 converts the direction of the linearly polarized light by 90 degrees, so that the light beam emitted from the light source of the integrated optical device 12 passes through the beam splitter and so that the reflection light beam from the optical disc 102 is reflected by the beam splitter of the integrated optical device 12 and is guided to the signal-reproduction light-receiving element.

The aberration correcting device 14 is disposed in an optical path connecting the integrated optical device 12 and the collimator lens 18, that is, in the optical path connecting the light source and the collimator lens 18. In the embodiment, the aberration correcting device 14 is disposed towards the light source.

The optical path connecting the light source and the collimator lens 18 is an optical path for a divergent light beam whose cross section increases as the light beam emitted from the light source propagates in the direction of propagation. It is also an optical path for a convergent light beam whose cross section decreases as the reflection light beam condensed by the collimator lens 18 propagates in the direction of propagation. In other words, divergent light and convergent light pass through the optical path connecting the light source and the collimator lens 18.

Figure 3A:
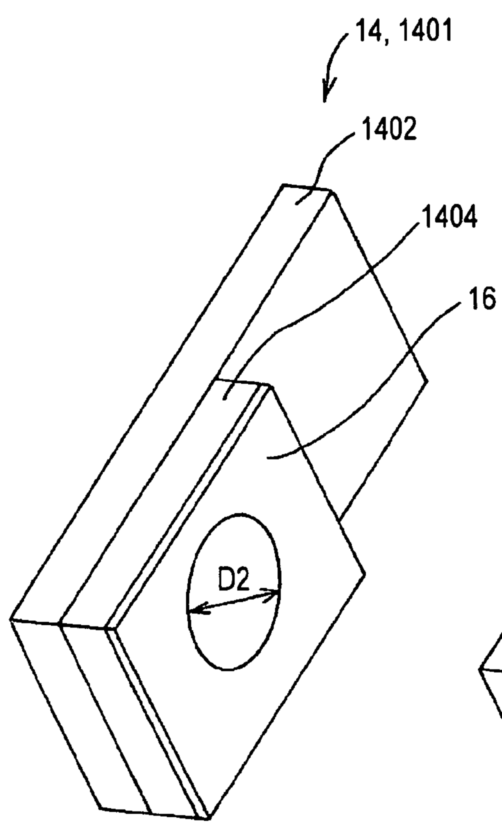
FIGS. 3A and 3B are each perspective views of an aberration correcting device 14.

In the embodiment, as shown in FIG. 3A, the aberration correcting device 14 includes a liquid crystal element 1401 formed by a first transparent substrate 1402 and a second transparent substrate 1404, a liquid crystal layer (not shown), and transparent electrodes (not shown). The first transparent substrate 1402 and the second transparent substrate 1404 are superposed upon each other. The liquid crystal layer is sealed in a space having a uniform thickness and formed between the first transparent substrate 1402 and the second transparent substrate 1404. The transparent electrodes are formed on respective surfaces of the first and second transparent substrates 1402 and 1404 facing the liquid crystal layer.

In the aberration correcting device 14, the first transparent substrate 1402 faces the light source, the second transparent substrate 1404 faces the collimator lens 18, and the ¼ wavelength plate 16 is superposed upon and is mounted to the surface of the second transparent substrate 1404 facing the collimator lens 18.

The transparent electrodes include, for example, one circular electrode and a plurality of annular electrodes concentrically disposed around the outer circumference of the one circular electrode. A flexible substrate (not shown) is connected to each electrode, and a drive signal from the aberration controller 140 is supplied to each electrode through the flexible substrate.

Supplying drive signals having different voltages to the electrodes causes the orientation of liquid crystal molecules of the liquid crystal layer to change in accordance with the electrodes, so that the refractive index of the liquid crystal layer also changes in accordance with the electrodes.

More specifically, the refractive index of the liquid crystal layer is changed so that a wavefront change that is in opposite phase to aberration (spherical aberration) occurs.

This makes it possible to correct aberration caused by variations in the characteristics of an optical element (optical component) in the optical system including the light source and the objective lens, or aberration caused by variations in the thickness of a optical recording medium, or aberration caused by differences in the locations of recording layers of a two-layer optical recording medium.

According to the above-described structure, the collimator lens 18 is disposed so that its distance d1 from the light source is the same as the focal length of the collimator lens 18. In other words, the focal length of the collimator lens 18 is typically provided between the light source and the collimator lens 18.

In addition, this distance d1, that is, the distance d1 between the integrated optical device 12 and the collimator lens 18 is larger than a thickness d0 of the aberration correcting device 14 (that is, a size d0 of the aberration correcting device 14 in the direction in which the light beam passes the aberration correcting device 14).

In this embodiment, focusing attention on this distance d1, the aberration correcting device 14 is disposed in the optical path connecting the integrated optical device 12 and the collimator lens 18.

Therefore, it is possible to reliably set a distance between the aberration correcting device 14 and the integrated optical device 12 that are adjacent each other and a distance between the aberration correcting device 14 and the collimator lens 18 that are adjacent each other, so that it is possible to reliably prevent interference between the aberration correcting device 14 and the integrated optical device 12 and interference between the aberration correcting device 14 and the collimator lens 18.

In contrast, when, as in the related art, the aberration correcting device 14 is disposed between the collimator lens 18 and the objective lens 22, for example, when the aberration correcting device 14 is disposed between the collimator lens 18 and the rising mirror 20, clearances are typically provided between the aberration correcting device 14 and the collimator lens 18 that are adjacent each other and between the aberration correcting device 14 and the rising mirror 20 that are adjacent each other in order to prevent interference (such as thermal expansion) therebetween.

In addition, when the aberration correcting device 14 is disposed between the rising mirror 20 and the objective lens 22, clearances are typically provided between the aberration correcting device 14 and the rising mirror 20 that are adjacent each other and between the aberration correcting device 14 and the objective lens 22 that are adjacent each other in order to prevent interference (such as thermal expansion) therebetween.

In contrast, in the embodiment, clearances are not typically provided for preventing such interference, so that an increase in the optical path length of the optical system of the optical pickup 10 can be considerably restricted. This is advantageous in reducing the size of the optical pickup 10 and the optical disc apparatus 101.

As shown in FIG. 2, if an effective diameter of a light beam and a reflection light beam that pass through the optical path between the collimator lens 18 and the objective lens 22 is a first effective diameter D1 and an effective diameter of a light beam and a reflection light beam that pass through the optical path between the light source and the collimator lens 18 is a second effective diameter D2, the second effective diameter D2 is equal to or less than the first effective diameter D1, and becomes smaller with decreasing distance from the light source.

Since the aberration correcting device 14 is disposed in the optical path connecting the integrated optical device 12 and the collimator lens 18, the closer the aberration correcting device 14 is to the light source, the smaller the second effective diameter D2 at the aberration correcting device 14.

Therefore, by disposing the aberration correcting device 14 towards the light source, that is, by bringing the aberration correcting device 14 towards the light source, aberrations of the aberration correcting device 14 itself can be reduced by reducing the size of the aberration correcting device 14. This is advantageous from the viewpoint of reducing manufacturing costs of the aberration correcting device 14.

In addition, reducing the size of the aberration correcting device 14 makes it possible to reduce the amount of material used for the first transparent substrate 1402 and the second transparent substrate 1404 of the aberration correcting device 14. This is advantageous from the viewpoint of reducing manufacturing costs of the aberration correcting device 14.

For example, if, as in the embodiment, the aberration correcting device 14 is disposed towards the light source in the optical path connecting the integrated optical device 12 and the collimator lens 18, the size of the aberration correcting device 14 and the second effective diameter D2 at the aberration correcting device 14 can be reduced as in FIG. 3A.

Figure 3B:
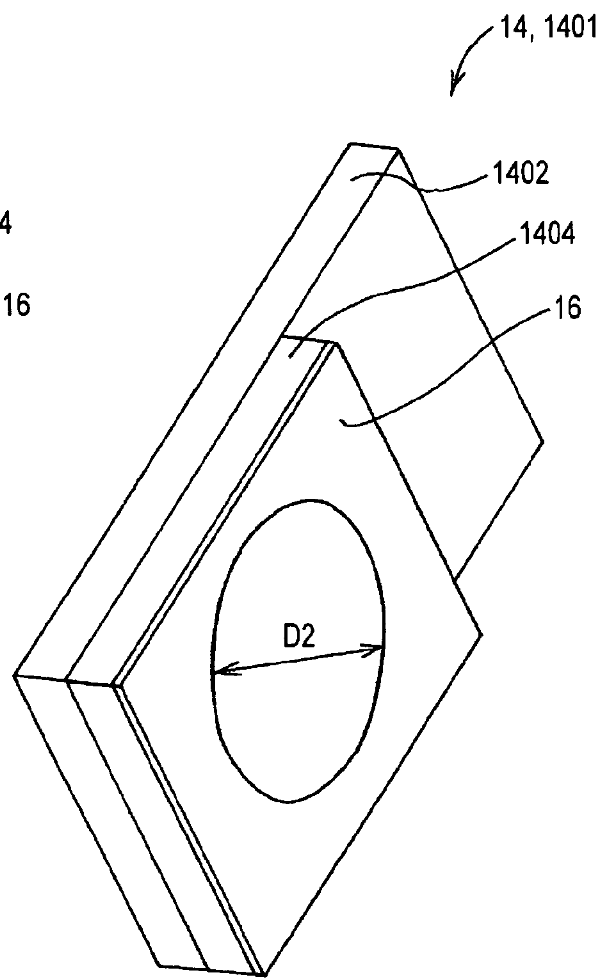

In contrast, if, as in the related art, the aberration correcting device 14 is disposed between the collimator lens 18 and the objective lens 22, the size of the aberration correcting device 14 and the second effective diameter D2 at the aberration correcting device 14 are large as shown in FIG. 3B.

In mounting the aberration correcting device 14 to the slide base, when a recess, a notch, or an opening for accommodating the aberration correcting device 14 is formed in the slide base, the smaller the aberration correcting device 14, the smaller the recess, the notch, or the opening. This is advantageous from the viewpoint of providing the slide base with mechanical strength.

Next, a comparative example will be described.

Figures 4A, 4B, 4C:
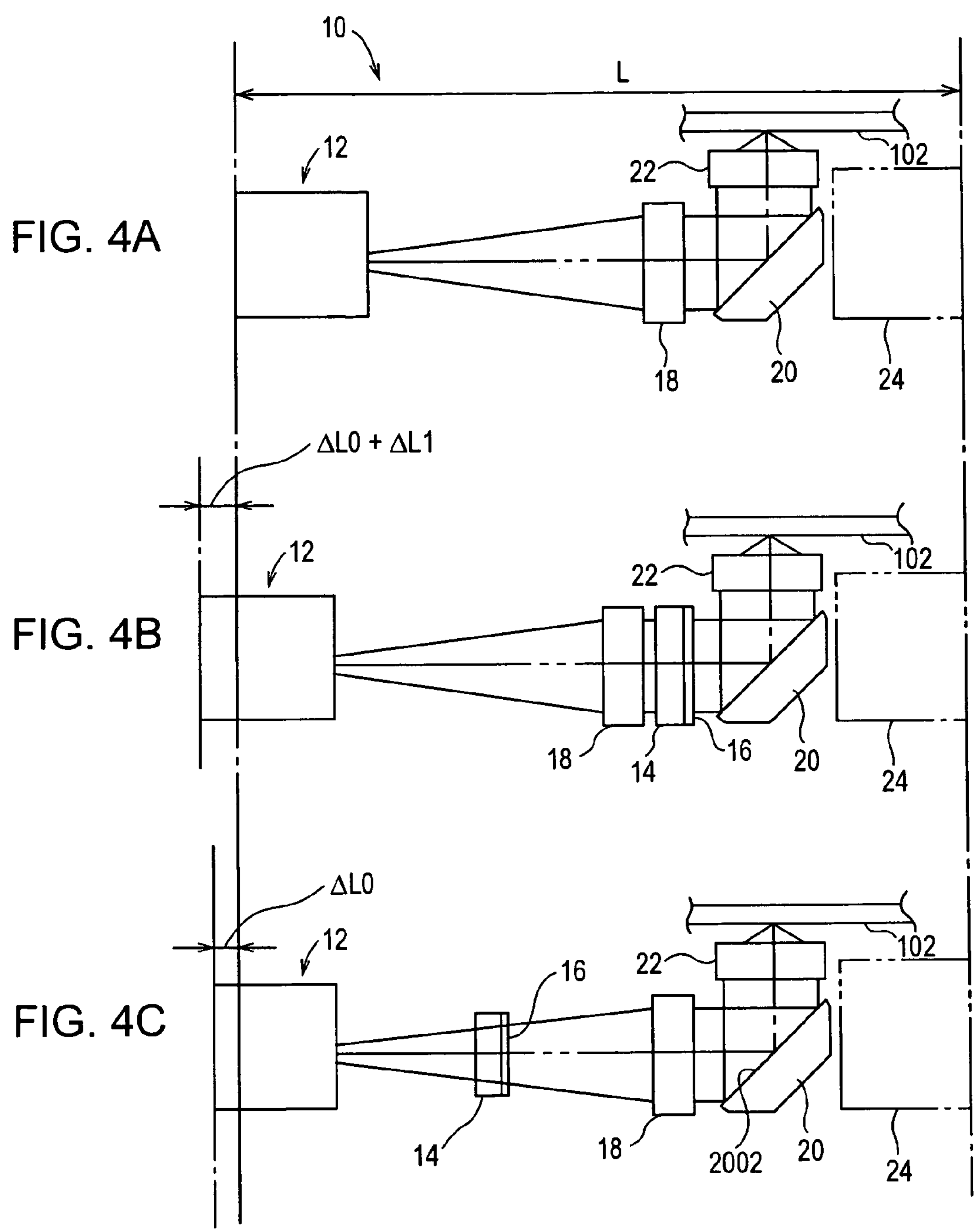
FIG. 4A shows a structure of an optical system without an aberration correcting device.
FIG. 4B shows a structure of an optical system when an aberration correcting device is disposed between a collimator lens and an objective lens as in the related art.
FIG. 4C shows the structure of the optical system according to the embodiment of the present invention.

FIG. 4A shows a structure of an optical system without an aberration correcting device, FIG. 4B shows a structure of an optical system when an aberration correcting device is disposed between a collimator lens and an objective lens as in the related art, and FIG. 4C shows the structure of the optical system according to the embodiment of the present invention. Hereunder, corresponding parts to those in the first embodiment will be given the same reference numerals and will be described.

As shown in FIG. 4A, the distance from an integrated optical device 12 to an actuator 24 when an aberration correcting device 14 does not exist is L.

As shown in FIG. 4B, when, as in the related art, an aberration correcting device 14 is disposed between a collimator lens 18 and a rising mirror 20, a distance ΔL0 resulting from the refractive index of the aberration correcting device 14 and a sum ΔL1 of the distance between the aberration correcting device 14 and the collimator lens 18 and the distance between the aberration correcting device 14 and the rising mirror 20 are typically provided. Therefore, the distance from an integrated optical device 12 to an actuator 24 is greater than the distance L by ΔL0+ΔL1.

The distance ΔL0 resulting from the refractive index of the aberration correcting device 14 will be described. The refractive indices of the first transparent substrate 1402, the second transparent substrate 1404, and the liquid crystal layer of the aberration correcting device 14 are greater than the refractive index of air. Therefore, when a light beam passes through the aberration correcting device 14, the light beam is refracted. Consequently, an effect that corresponds to increasing the focal length of the collimator lens 18 occurs. The distance corresponding to the increased focal length is equal to ΔL0.

As shown in FIG. 4C, in the embodiment, since the aberration correcting device 14 is disposed in the optical path connecting the integrated optical device 12 and the collimator lens 18, clearances are not typically required in front of and behind the aberration correcting device 14 as compared to the case shown in FIG. 4B. Therefore, the distance ΔL0 resulting from the refractive index of the aberration correcting device 14 is only considered. Consequently, the distance from the integrated optical device 12 to the actuator 24 is larger than the distance L by only ΔL0, so that the size of the optical system can be made smaller than the optical system shown in FIG. 4B.

Although, in the first embodiment, the integrated optical device 12 and the aberration correcting device 14 are formed as separate elements, the aberration correcting device 14 may be integrally mounted to the integrated optical device 12.

Figure 5:
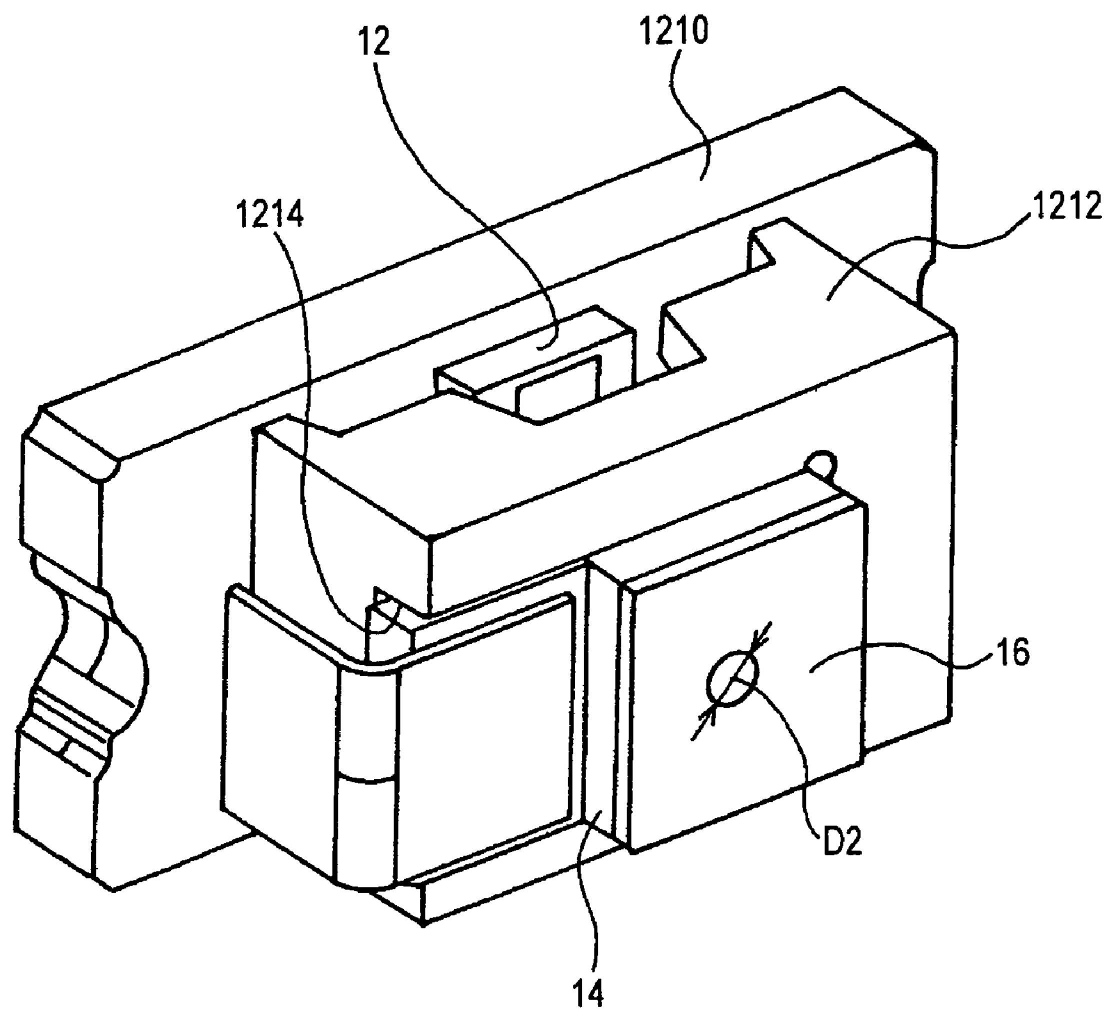
FIG. 5 is a perspective view of a structure in which the aberration correcting device 14 is mounted to an integrated optical device 12.

More specifically, as shown in FIG. 5, the integrated optical device 12 is mounted to a surface of a plate holder 1210.

A mounting member 1212 is mounted to the surface of the holder 1210 so as to cover the front of the integrated optical device 12, and a recess 1214 for mounting the aberration correcting device 14 is formed in a side of the mounting member 1212 opposite to a side facing the integrated optical device 12.

The aberration correcting device 14 is mounted to the recess 1214. With the aberration correcting device 14 being mounted to the recess 1214, an opening (not shown) for passing a light beam from the light source of the integrated optical device 12 is formed in the recess 1214 facing the aberration correcting device 14. The light beam from the light source passes through the aberration correcting device 14 through this opening, and a reflection light beam passes through the aberration correcting device 14 and is guided to the signal-reproduction light-receiving element of the integrated optical device 12 through the opening.

The mounting member 1212 is formed so that, by accommodating the aberration correcting device 14 in the recess 1214, the aberration correcting device 14 and the light source are positioned.

When the integrated optical device 12 and the aberration correcting device 14 are integrally mounted to each other, the distance between the light source of the integrated optical device 12 and the aberration correcting device 14 and the distance between the signal-reproduction light-receiving element of the integrated optical device 12 and the aberration correcting device 14 are reduced, thereby making it possible to reduce the effective diameter D2 of the light beam at the aberration correcting device 14. This is advantageous from the viewpoints of reducing the size and costs of the aberration correcting device 14.

Second Embodiment

Next, a second embodiment will be described.

Figure 6:
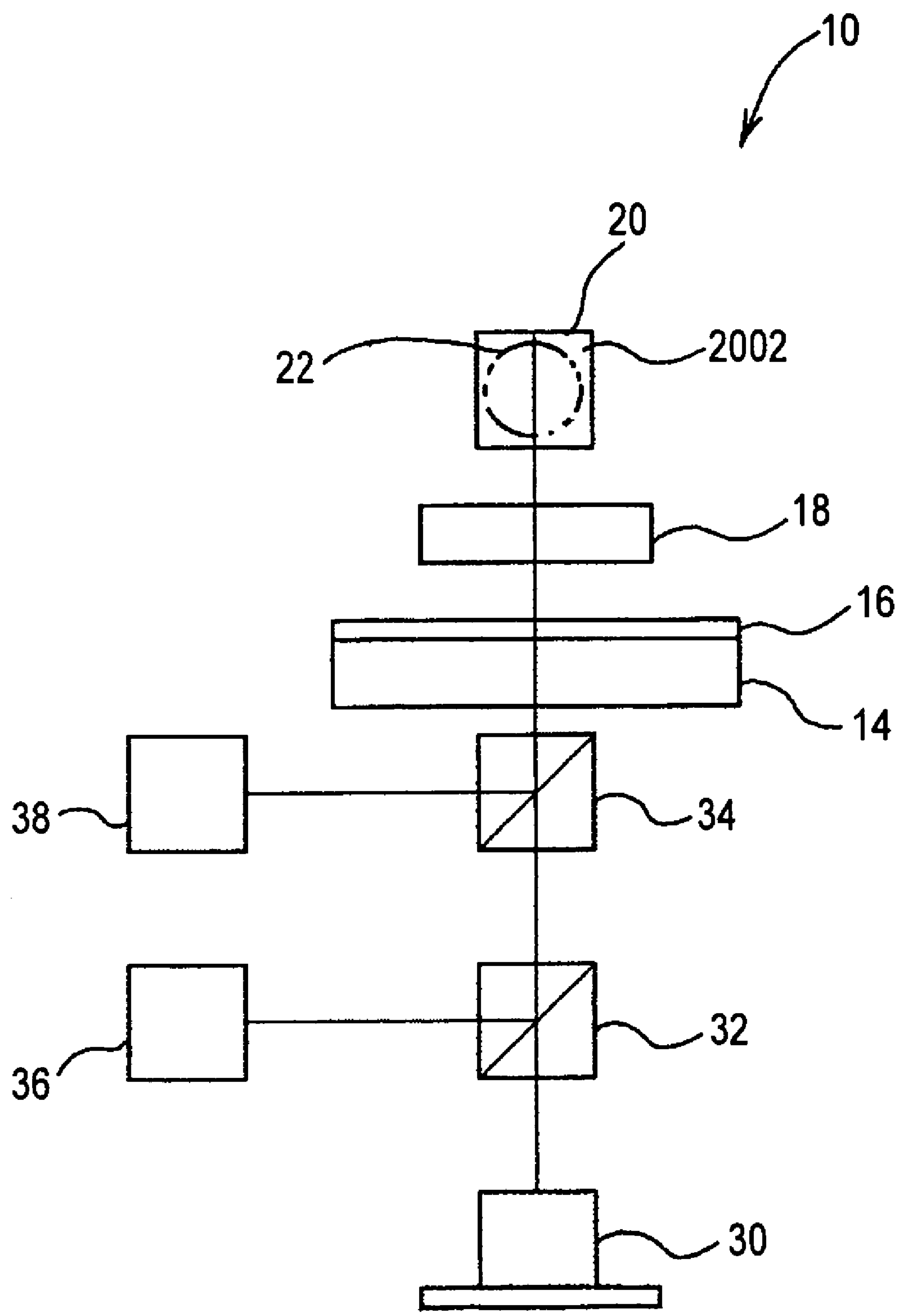
FIG. 6 shows a structure of an optical system of an optical pickup 10 according to a second embodiment of the present invention.

FIG. 6 shows a structure of an optical system of an optical pickup 10 according to a second embodiment of the present invention.

The second embodiment differs from the first embodiment in that, whereas the light source is integrated to each light-receiving element in the integrated optical device 12 in the first embodiment, a light source and each light-receiving element are separately formed in an integrated optical device in the second embodiment.

As shown in FIG. 6, the optical system of the optical pickup 10 includes a light source 30, a first beam splitter 32, a second beam splitter 34, a signal-reproduction light-receiving element 36, a light-source-monitoring light-receiving element 38, an aberration correcting device 14, a ¼ wavelength plate 16, a collimator lens 18, a rising mirror 20, an objective lens 22, and an actuator (not shown). These parts are formed by mounting them on a slide base (not shown).

The first beam splitter 32, the second beam splitter 34, the aberration correcting device 14, the ¼ wavelength plate 16, and the collimator lens 18 are disposed in a straight line in that order in front of the light source 30. The objective lens 22 is disposed above the rising mirror 20.

The light source 30 is formed by a laser diode.

The first beam splitter 32 is formed so that a light beam from the light source 30 passes through the first beam splitter 32 as it is and a reflection light beam is reflected at an optical disc 102 and is guided to the signal-reproduction light-receiving element 36.

The signal-reproduction light-receiving element 36 is disposed beside the first beam splitter 32 and is formed so that it detects, for example, a focusing error signal, a tracking error signal, or an RF signal by receiving the reflection light beam.

The second beam splitter 34 reflects a portion of the light beam that has passed through the first beam splitter 32 and guides the reflected light beam portion to the light-source-monitoring light-receiving element 38. The second beam splitter 34 also guides the reflection light beam to the first beam splitter 32 without reflecting it.

The light-source-monitoring light-receiving element 38 detects a monitor signal of a light-exiting power of the light source 30 by receiving the portion of the light beam.

The collimator lens 18 is formed so that the light beam emitted from the light source 30 as a divergent light beam is incident upon the collimator lens 18 through the aberration correcting device 14 and the ¼ wavelength plate 16 and so that the light beam exits as a parallel light beam towards the rising mirror 20. The collimator lens 18 is disposed so that its distance from the light source is the same as the focal length of the collimator lens 18.

A reflection surface 2002 of the rising mirror 20 is disposed at an angle of 45 degrees with respect to the optical axis of the collimator lens 18. The rising mirror 20 is formed so that the light beam guided from the collimator lens 18 as a parallel light beam is reflected by being upwardly bent by 90 degrees (in a direction perpendicular to the plane of FIG. 6) by the reflection surface 2002.

The optical axis of the objective lens 22 is disposed at an angle of 45 degrees with respect to the reflection surface 2002. The objective lens 22 is formed so the light beam reflected by the reflection surface 2002 as a parallel light beam is condensed and is used to irradiate a recording layer of the optical disc 102.

As in the first embodiment, the aberration correcting device 14 is disposed in an optical path connecting the integrated optical device 12 and the collimator lens 18, that is, in the optical path connecting the light source 30 and the collimator lens 18.

In the aberration correcting device 14, a first transparent substrate 1402 faces the light source 30, a second transparent substrate 1404 faces the collimator lens 18. As in the first embodiment, the ¼ wavelength plate 16 is superposed upon and is mounted to the surface of the second transparent substrate 1404 facing the collimator lens 18.

As with the first embodiment, the second embodiment having such a structure is advantageous from the viewpoint of reducing the size of the optical pickup 10 and an optical disc apparatus 101. In addition, as with the first embodiment, the second embodiment is advantageous from the viewpoint of reducing manufacturing costs of the aberration correcting device 14 by disposing the aberration correcting device 14 towards the light source 30 and reducing the size of the aberration correcting device 14.

Although, in the embodiments, the ¼ wavelength plate 16 is mounted to the aberration correcting device 14, the ¼ wavelength plate 16 may be formed separately from the aberration correcting device 14.

Although, in the embodiments, the aberration correcting device 14 includes the liquid crystal element 1401, it is obvious that the aberration correcting device 14 may be any type of aberration correcting device as long as the refractive index is changed so that a wavefront change that is in opposite phase to spherical aberration occurs, that is, as long as it corrects aberration.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical pickup, comprising:

a light source for emitting a light beam;

an objective lens for condensing the light beam emitted from the light source and irradiating an optical recording medium with the condensed light beam;

a collimator lens, disposed between the light source and the objective lens, for forming the light beam emitted from the light source into a parallel light beam and guiding the parallel light beam to the objective lens; and an aberration correcting device, disposed in an optical path connecting the light source and the optical recording medium, for correcting aberration, wherein the aberration correcting device and the light source are integrally mounted to each other.

2. The optical pickup according to claim 1, further comprising a light-receiving element which receives a reflection light beam reflected by the optical recording medium as a result of irradiating the optical recording medium with the light beam from the objective lens, the reflection light beam passing through the collimator lens and the aberration correcting device from the objective lens and being guided to the light-receiving element.

3. The optical pickup according to claim 1, wherein the aberration is spherical aberration, the aberration correcting device includes a liquid crystal element, and the refractive index of the liquid crystal element is changed so that a wavefront change that is in opposite phase to the spherical aberration occurs.

4. An optical pickup comprising:

a light source for emitting a light beam;

an objective lens for condensing the light beam emitted from the light source and irradiating an optical recording medium with the condensed light beam;

a collimator lens, disposed between the light source and the objective lens, for forming the light beam emitted from the light source into a parallel light beam and guiding the parallel light beam to the objective lens;

an aberration correcting device, disposed in an optical path connecting the light source and the optical recording medium, for correcting aberration; and a ¼ wavelength plate mounted to a surface of the aberration correcting device facing the collimator lens, wherein the aberration correcting device is disposed in an optical path connecting the light source and the collimator lens.

5. The optical pickup according to claim 1, further comprising:

a ¼ wavelength plate disposed between the aberration correcting device and the objective lens; and a beam splitter disposed in the optical path so that the beam splitter is placed between the light source and the aberration correcting device, the beam splitter passing the light beam from the light source therethrough and irradiating the optical recording medium with the light beam, the beam splitter guiding a reflection light beam reflected by the optical recording medium to a light-receiving element.

6. The optical pickup according to claim 1, further comprising:

a ¼ wavelength plate disposed between the aberration correcting device and the objective lens; and a beam splitter disposed in the optical path so that the beam splitter is placed between the light source and the aberration correcting device, the beam splitter passing the light beam from the light source therethrough and irradiating the optical recording medium with the light beam, the beam splitter guiding a reflection light beam reflected by the optical recording medium to a light-receiving element, wherein the light source, the beam splitter, and the light-receiving element are mounted to one base.

7. An optical disc apparatus, comprising:

driving means for holding an optical recording medium and rotationally driving the optical recording medium; and an optical pickup for irradiating with a recording and/or a reproduction light beam the optical recording medium which is rotationally driven by the driving means and detecting a reflection light beam reflected by the optical recording medium as a result of irradiating the optical recording medium with the recording and/or the reproduction light beam, wherein the optical pickup includes a light source for emitting the light beam, an objective lens for condensing the light beam emitted from the light source and irradiating the optical recording medium with the condensed light beam, a collimator lens, disposed between the light source and the objective lens, for forming the light beam emitted from the light source into a parallel light beam and guiding the parallel light beam to the objective lens, and an aberration correcting device, disposed in an optical path connecting the light source and the optical recording medium, for correcting aberration, wherein the aberration correcting device and the light source are integrally mounted to each other.

8. An optical disc apparatus, comprising:

a driver for holding an optical recording medium and rotationally driving the optical recording medium; and an optical pickup for irradiating with a recording and/or a reproduction light beam the optical recording medium which is rotationally driven by the driver and detecting a reflection light beam reflected by the optical recording medium as a result of irradiating the optical recording medium with the recording and/or the reproduction light beam, wherein the optical pickup includes a light source for emitting the light beam, an objective lens for condensing the light beam emitted from the light source and irradiating the optical recording medium with the condensed light beam, a collimator lens, disposed between the light source and the objective lens, for forming the light beam emitted from the light source into a parallel light beam and guiding the parallel light beam to the objective lens, and an aberration correcting device, disposed in an optical path connecting the light source and the optical recording medium, for correcting aberration, wherein the aberration correcting device and the light source are integrally mounted to each other.

* * * * *